United States Patent Office 2,716,281
Patented Aug. 30, 1955

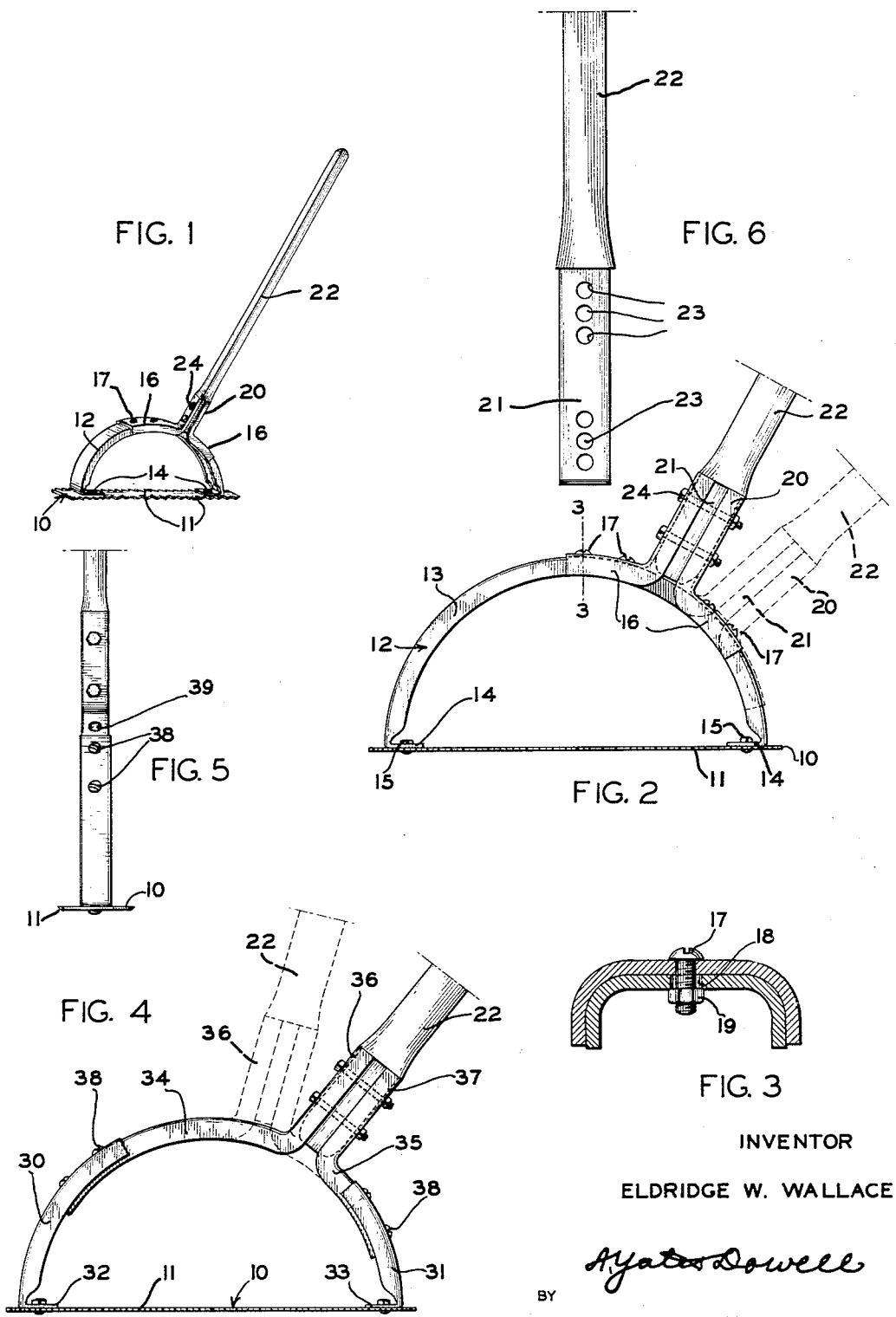
Aug. 30, 1955  E. W. WALLACE  2,716,281
ADJUSTABLE WEED CUTTER
Filed Jan. 26, 1953
INVENTOR
ELDRIDGE W. WALLACE
BY
ATTORNEY

2,716,281

ADJUSTABLE WEED CUTTER

Eldridge W. Wallace, Oakland, Maine, assignor to North Wayne Tool Company, Oakland, Maine, a corporation of Maine Application January 26, 1953, Serial No. 333,278

5 Claims. (Cl. 30—279)

This invention relates to harvesting or clearing of land and more particularly to a weed cutter of the type which is adapted to be swung back and forth, with cutting on each swing.

Weed cutters of this general character are particularly useful for the individual home owner and afford an easy means for cutting small amounts of weeds as well as crab grass and other undesirable growth occurring frequently on a lawn.

Because of the size and weight of the device, it may be used by young and old alike, and as it does not have an extended cutting edge such as that on a scythe or sickle, its use is not accompanied by the hazards of these devices.

In an attempt to produce a tool for universal use, the tool has been provided with a handle attached at a certain angle to the cutting member and of an average length. For youngsters or persons of a height substantially less or greater than that of the average, the tool is inconvenient to use.

Accordingly, it is an object of the invention to provide a weed cutter of the type described which is easily and quickly adjustable to the preferred height and degree of angularity.

Further objects are to provide a weed cutter which is simple and sturdy, and whose handle may be adjusted in length or the angularity of it with respect to the cutter changed.

These and other objects of the invention will become apparent from the following description in conjunction with the accompanying drawing in which:

Fig. 1 is a perspective of a device constructed in accordance with the present invention;

Fig. 2, a side elevation to an enlarged scale, omitting the upper portion of the handle and illustrating the angular adjustment of the handle;

Fig. 3, a section on the line 3—3 of Fig. 2;

Fig. 4, a side elevation similar to Fig. 2 of a modified form of the device;

Fig. 5, an end elevation of the device of Fig. 4, and

Fig. 6, an elevation to an enlarged scale of the lower portion of a handle constructed in accordance with the invention.

Briefly stated, the weed cutter has a flat blade with cutting edges on each side thereof, the ends of the blade being attached to a holder of substantially semi-circular configuration. A handle is connected to the blade holder by means of a pair of diverging arms conforming to the shape of the holder, which are adjustable by means of a bolt and slot, or bolt and series of spaced apertures, the handle having a plurality of spaced holes at its lower end by means of which it may be adjustably secured between a pair of spaced tangs extending from the arms.

Referring to the drawing, the weed cutter has a flat, elongated blade 10 with cutting surfaces 11 on each longitudinal side thereof. The blade is carried by a holder or yoke 12, having a body 13 of channel section and substantially semi-circular configuration. At each end of the body a flat foot portion 14 is turned under and connected by fastening means 15 to an end of the blade.

Connected to the body 13 of the holder 12 are a pair of diverging arms 16, also of channel section, which engage a portion of the body 13. Bolts 17 extend through spaced apertures in the arms and through an elongated slot 18 in the body and are secured by nuts 19. The arms 16 are arcuate or curved to conform to the curve of the body 13. The arms have extensions 20 providing tangs between which the lower end 21 of a handle 22 is received. The end 21 has upper and lower sets of spaced apertures 23 for the reception of fastening means 24 extending through the tangs 20.

In the use of the device described, the fastening means 17 may be loosened to permit the desired angular adjustment of the arms 16 with respect to the body 13 and then tightened to secure the members in such relative position. Also, the fasteners 24 may be removed, if desired, to shift the handle inwardly or outwardly with respect to the tangs 20 and replaced through the desired holes 23 in the handle. Thus, persons of varying heights and bodily constructions will be accommodated.

In the modification of Figs. 4 and 5 the blade 10 is attached to first and second arcuate channel members 30, 31, each having an offset foot 32, 33. Channel members 30, 31 extend upwardly and converge toward each other, member 30 being substantially longer than member 31 in the illustrated embodiment. The members preferably lie in a smooth curve such as a circle. An arm 34 is attached to the member 30 and an arm 35 to the member 31, tangs 36, 37 extending up from the arms 34, 35 respectively to form a yoke. The arms 34, 35 are of channel section and are received by the channel members 30, 31. The arms are attached to the members 30, 31 by means of fasteners or bolts 38 which extend through apertures therein and into selected spaced apertures 39 in the arms 34, 35. In order to adjust the angular relation of the handle with respect to the blade, the bolts 38 may be engaged with any of the spaced apertures in the arms.

It will be understood that in both forms of the device illustrated, the blade, the blade holder, the arms and the tangs all lie in a common plane. Through the use of the device described, the individual may adjust the handle of the cutter to the preferred angular relation and to a length that is convenient.

Although particular forms of the device have been specifically illustrated and described, it will be understood by those skilled in the art that the invention is not thus limited but that reasonable variations and modifications thereof are within its scope, and therefore the invention is only limited as found in the following claims.

I claim:

1. A weed cutter comprising a blade, arcuately shaped members extending from opposite end portions of said blade and converging toward one another, arcuately shaped arms for registry with said arcuately shaped members for adjustable movement longitudinally of said members, means to fix said arcuately shaped arms on said arcuately shaped members in adjustable relationship, and handle attaching means secured to said arcuately shaped arms for securing said arms to said handle whereby the handle may be mounted in fixed relation to said blade.

2. A cutting implement comprising a blade, an arcuate bow-shaped member fixed at its ends to opposite end portions of said blade, a handle, at least one arcuately shaped arm secured to said handle and extending laterally therefrom, said arm having substantially the same curvature as said bow and being relatively movable to the bow to provide longitudinal adjustment relative thereto, interengaging means between said arm and said bow for fixing said arm and said bow in adjusted relation, the angularity of said handle with respect to said blade being adjustable as desired by relative movement of said arcuate shaped arm on said arcuate bow-shaped member.

3. A weed cutter comprising a flat elongated blade having cutting surfaces on its opposite side edges, a holder for the blade, said holder comprising first and second arcuate channel members each having an offset foot lying flatwise to the blade and attached to an opposite end thereof, the members extending upwardly therefrom and converging toward each other, and having openings therein the first channel member being substantially longer than the second, said channel members lying substantially in a common circle, and a yoke connecting said channel members, said yoke comprising first and second arms of channel section engaging the first and second channel members, respectively, said arms diverging and forming substantially an arc of the circle in which the channel members lie, said arms each having a plurality of spaced apertures therein, fastening means extending through the openings in the channel members and through at least one of the apertures of each arm whereby the arms may be adjusted relative to the channel members, a tang extending from each arm, the tangs being positioned adjacent to each other, the axes of the tangs, arms, yoke and blade lying in a common plane, and a handle secured to the tangs and extending upwardly from the blade.

4. A weed cutter comprising a flat elongated blade having cutting surfaces on its opposite side edges, a holder for the blade, said holder comprising first and second arcuate channel members each having an offset foot at opposite ends thereof, the bodies of the members extending upwardly therefrom and converging toward each other and having openings therein, said channel members lying substantially in a common circle, and a yoke connecting said channel members, said yoke comprising first and second arms of channel section for engaging the first and second channel members, respectively, said arms diverging and forming substantially an arc of the circle in which the channel members lie, said arms each having a plurality of spaced apertures therein, fastening means extending through the openings in said channel members and through at least one of the apertures of each arm whereby the arms may be adjusted relative to the channel members, a tang extending from each arm, the tangs being positioned adjacent to each other, the axes of the tangs, arms, yoke and blade lying in a common plane, and a handle secured to the tangs and extending upwardly from the blade.

5. A weed cutter comprising a flat elongated blade having cutting surfaces on its opposite side edges, a holder for the blade, said holder comprising first and second curved channel members each having an offset foot at opposite ends thereof, the bodies of the members extending upwardly therefrom and converging toward each other and having openings therein, said channel members defining a smooth curve, and a yoke connecting said channel members, said yoke comprising first and second arms of channel section for engaging the channel members, said arms diverging and defining a portion of the curve defined by the channel members, said arms each having aperture means extending a substantial portion of its length, fastening means extending through the openings in said channel members and through the aperture means of each arm whereby the arms may be adjusted relative to the channel members, tang means extending from the arms, and a handle secured to the tang means and extending upwardly from the blade.

References Cited in the file of this patent
UNITED STATES PATENTS

| | | |
|---|---|---|
| 1,725,655 | Leard | Aug. 20, 1929 |
| 1,850,438 | Yaw | Mar. 22, 1932 |
| 1,992,287 | Byars | Feb. 26, 1935 |